UNITED STATES PATENT OFFICE.

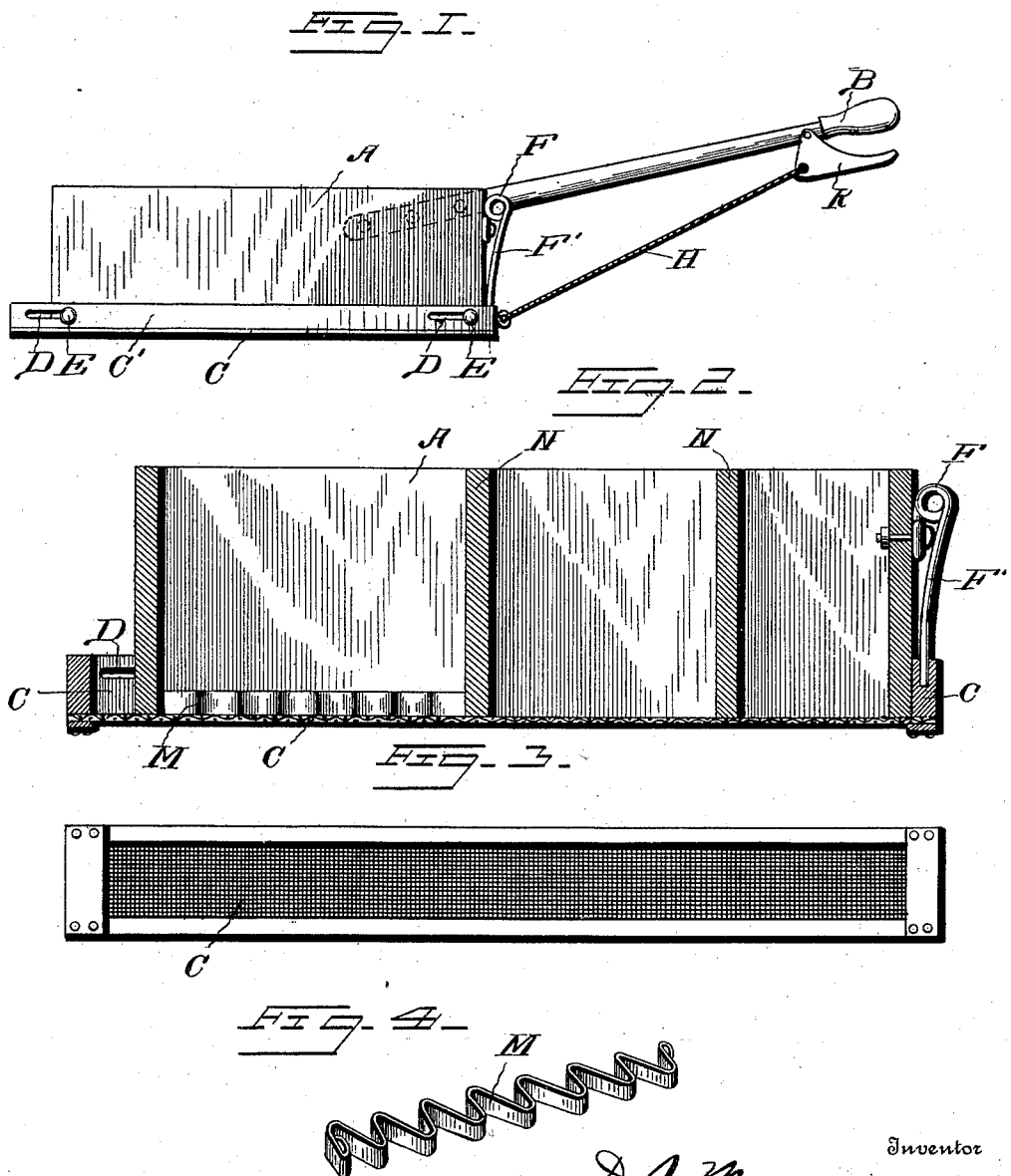

DAVID JACKSON MANNING, OF CHIPPEWA FALLS, WISCONSIN.

INSECT-DESTROYER.

SPECIFICATION forming part of Letters Patent No. 691,909, dated January 28, 1902.

Application filed November 15, 1901. Serial No. 82,467. (No model.)

*To all whom it may concern:*

Be it known that I, DAVID JACKSON MANNING, a citizen of the United States, residing at Chippewa Falls, in the county of Chippewa and State of Wisconsin, have invented certain new and useful Improvements in Insect-Destroyers; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in insect-destroyers; and it consists in the provision of an apparatus for sifting poison on vines and comprises a receptacle having compartments in which the material to be sifted is carried and a reciprocating bottom and means for regulating the amount of poison it is desired to sift upon the vines.

The invention consists, further, in various combinations and arrangement of parts, as will be hereinafter more fully described and then specifically defined in the appended claims and illustrated in the accompanying drawings, which, with the letters of reference marked thereon, form a part of this application, and in which drawings—

Figure 1 is a side elevation of my improved apparatus. Fig. 2 is a central longitudinal sectional view through the receptacle and reciprocating bottom. Fig. 3 is a bottom plan view. Fig. 4 is a detail view of a zigzag member placed within the receptacle.

Reference now being had to the details of the drawings by letter, A designates a receptacle or box of any suitable shape with closed sides and ends and open top and bottom. A suitable handle B is fastened to said receptacle on one side thereof. The sieve C has flanges C' about its edges and is adapted to fit over the bottom or lower portion of the receptacle. Said sieve is somewhat longer than the receptacle in order to allow for a reciprocating movement of the sieve against the bottom edges of the poison-containing receptacle A. Said sieve has elongated slots D in its longitudinal flanges and is supported on the pins E, fastened to the opposite sides of the receptacle, said pins passing through the elongated slots D. These pins and slots serve to guide the sieve as it is caused to reciprocate. A spring F is held to one end of the receptacle and has an arm F', which engages the end of the sieve-frame, thus serving to normally hold the end of the frame engaged by said spring in contact with the end of the receptacle. A cord or wire H is fastened at one end to the end of the sieve-frame, as shown, and its other end is secured to the hand-operated lever K, which is pivoted to the handle near its free end in convenient position to be gripped by the hand of the operator. By forcing the free end of said lever toward the handle the sieve may be moved longitudinally toward the free end of the handle and under the tension of said spring. When pressure is removed from the lever, the spring will return the sieve to its normal position.

In the receptacle are partitions N, which divide the same into compartments of different sizes designed to contain more or less of the poison to be distributed, some plants requiring more than others. In the lower portion of the receptacle are the zigzag members M, which may be held between the partitions or between a partition and an end wall of the receptacle and are provided for the purpose of holding the poison or other material which it is desired to sprinkle while the sieve is reciprocated under the bottom of the receptacle.

By causing the sieve to reciprocate, with the end flanges of the sieve-frame coming against the ends of the receptacle, imparting a jar to the latter, it will be noted that the poison will settle down readily on the sieve and will be prevented from clogging by the contact of the upper surface of the sieve against the poison.

Having thus described my invention, what I claim to be new, and desire to secure by Letters Patent, is—

1. An insect-destroyer comprising a receptacle with open bottom, a reciprocating sieve held over the lower open end thereof, a handle secured to the receptacle, a spring normally holding one end of said sieve against the end of the receptacle, and connections between the sieve and handle for pulling the sieve longitudinally under the tension of said spring, as set forth.

2. An insect-destroyer, comprising a receptacle with handles secured thereto, the lower end of the receptacle being open, a flanged sieve longer than the receptacle and fitting over the lower portion of the receptacle, means for holding the sieve thereto and allowing for a reciprocating movement of the sieve, a spring secured to the receptacle and having one end bearing against the end of said sieve, a cord or rod secured to the spring-engaging end of the sieve, a lever pivoted to one of said handles and to which lever the end of said cord or rod is connected, as set forth.

3. An insect-destroyer, comprising a receptacle with open bottom, a flanged sieve longer than the receptacle and fitted to have a reciprocating movement over the bottom thereof, pins secured to the opposite sides of the receptacle, and passing through elongated slots in the flanges of the sieve, and means for reciprocating the sieve, as set forth.

4. In combination with the receptacle having compartments and open bottom, the zigzag members positioned in said compartments near the lower end thereof, the reciprocating sieve held over the lower portion of the receptacle, and means for moving the sieve, as set forth.

In testimony whereof I hereunto affix my signature in presence of two witnesses.

DAVID JACKSON MANNING.

Witnesses:
H. H. TODD,
W. G. HARTWELL.